(No Model.)

A. T. IRION.
WHIP SOCKET.

No. 578,929. Patented Mar. 16, 1897.

WITNESSES
"J. Frank Culverwell"
George A. Byrne.

INVENTOR
Allen T. Irion.
by John Wedderburn
Attorney

UNITED STATES PATENT OFFICE.

ALLEN T. IRION, OF MORRISONVILLE, ILLINOIS.

WHIP-SOCKET.

SPECIFICATION forming part of Letters Patent No. 578,929, dated March 16, 1897.

Application filed November 23, 1896. Serial No. 613,185. (No model.)

*To all whom it may concern:*

Be it known that I, ALLEN T. IRION, a citizen of the United States, residing at Morrisonville, in the county of Christian and State of Illinois, have invented certain new and useful Improvements in Whip-Sockets; and I do hereby declare the following to be a full, clear, and exact description of the invention, such as will enable others skilled in the art to which it appertains to make and use the same.

My invention relates to whip-sockets.

My objects are to provide a socket for whips which will be provided with a rein-clamp and be of such peculiar construction that the whip can be locked in the socket when desirable, so that it can be removed only by an authorized person, and one which will serve to clamp or hold the reins when not in use.

Having these and other minor objects in view, the invention consists of certain details of construction and novel combinations of parts appearing more fully hereinafter.

Figure 1:
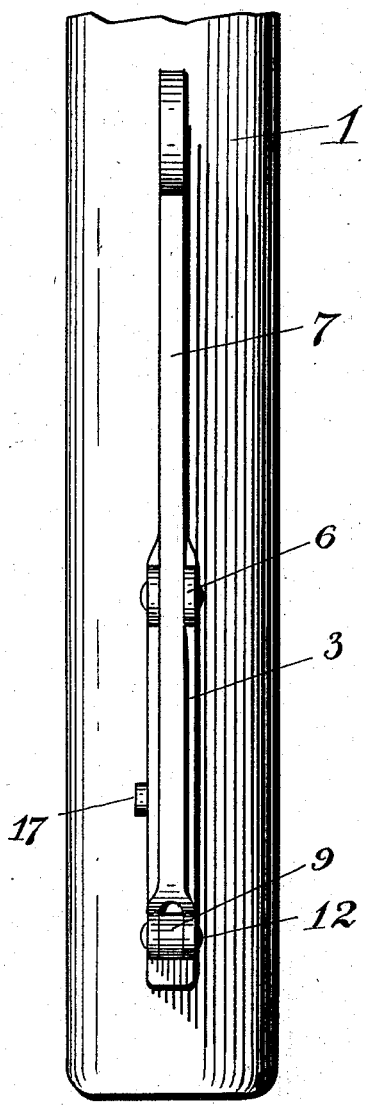
Figure 2:
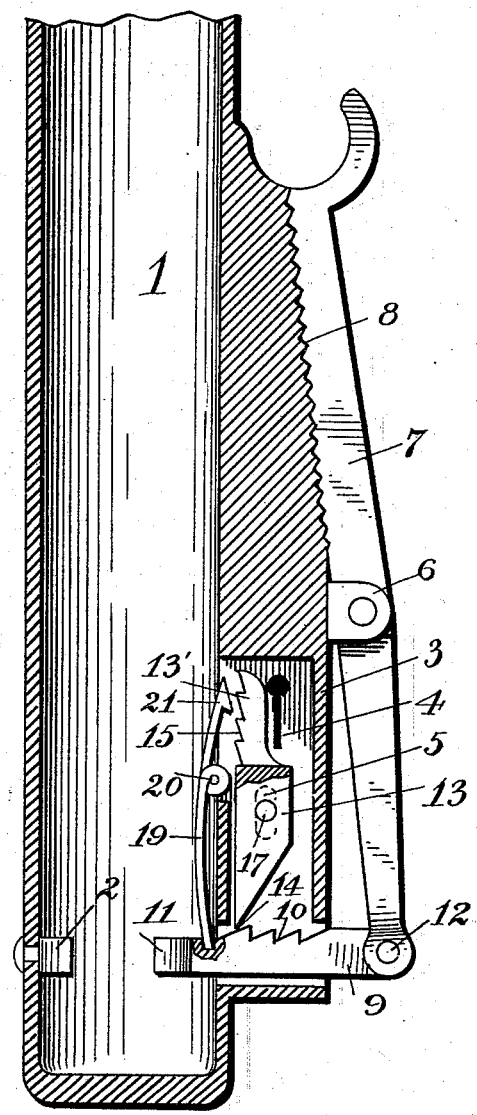

In the accompanying drawings, Figure 1 is a side elevation of my improved device, and Fig. 2 is a longitudinal section thereof.

The numeral 1 designates the socket proper, which is adapted to receive the butt of the whip. Inside this socket, somewhat above its lower end, is a concave or arc-shaped piece 2.

The numeral 3 designates a casing which is secured to the side of the socket, and has a keyhole 4 and a vertically-extending slot 5. This casing is provided with two ears 6. A clamping-lever 7 is pivoted to the ears, and both it and the face of the casing are provided with teeth 8.

The numeral 9 designates a bar having a toothed upper face 10, said bar carrying on its inner end an arc-shaped clamping-piece 11 and being slidable through the casing of the socket, this arc-shaped piece being located diametrically opposite the piece 2. The outer end of the bar 9 is pivoted to the lower end of the lever, as shown at 12. Movable vertically in the casing is a locking-bolt 13, which has a pointed lower end 14, adapted to engage with the teeth 10, and it is provided with a bifurcated upper end 13'. This bolt is provided with teeth 15 on its upper portion.

The numeral 17 designates a thumb-button which has a shank that works in the slot 5 and is connected to the locking-bolt.

The numeral 19 designates a spring which is coiled around the pin 20 inside the whip-socket and located at one side thereof, the lower portion of this spring engaging or connected with the bar 9 and serving to normally urge the latter outward. The upper end of the spring is made in the shape of a hook 21, which passes through a slot or opening in the socket and is adapted to engage with the teeth 15 of the bolt. The keyhole is so located in relation to the hook 21 that a key can be inserted and turned through the bifurcation of the bolt to move said hooked portion out of engagement with the teeth.

The device is used in the following manner: Ordinarily the whip would not be locked in this socket. When it is desirable to secure the whip, the reins can be inserted between the casing and the lever, whereupon the locking-bolt will be forced inwardly and the two arc-shaped members clasped against the side of the whip. The thumb-button should then be pressed downward to bring the pointed end of the locking-bolt in engagement with the teeth of the bar 9. When this is done, however, the part 21 rides on the teeth of the locking-bolt and prevents said locking-bolt from again being pushed upward by means of the thumb-button. Thus it will be observed that the bar 9 cannot be moved in or out, and hence the whip is clamped in the socket. Of course the reins need not be inserted in the clamp, and the lever itself can simply be moved to accomplish the locking operation. When it is desirable to release the whip, a key of proper shape must be inserted through the keyhole and made to move the hooked end of the spring out of engagement with the teeth of the locking-bolt, whereupon the latter can be moved upward and the spring will then urge the bar 9 outward and the whip will be released.

Having thus described my invention, what I claim as new, and desire to secure by Letters Patent, is—

1. In a whip-socket, the combination with a holder, of a movable bar adapted to bind upon or clamp the whip, said bar being provided with teeth, a movable locking-bolt adapted to engage with said teeth and said bolt having teeth, and a member adapted to engage with the teeth of the locking-bolt.

2. In a whip-socket, the combination with a holder, of a bar provided with teeth and adapted to bind on the whip, a movable locking-bolt adapted to engage with the teeth of the bar and also having teeth on its surface, a spring-pressed member normally in engagement with the teeth of the locking-bolt, and a pivoted lever which is also pivoted to the bar.

3. In a whip-socket, the combination with a holder, of a clamping-bar having teeth and adapted to bind on the whip, a spring serving to retract said bar, a movable bolt adapted to engage with the teeth of the bar, and means for locking said bolt.

In testimony whereof I have signed this specification in the presence of two subscribing witnesses.

ALLEN T. IRION.

Witnesses:
R. W. REASONER,
P. M. WARREN.